US008868459B2

(12) United States Patent
De Melo Esteves (10) Patent No.: US 8,868,459 B2
(45) Date of Patent: Oct. 21, 2014

(54) SYSTEM AND METHOD FOR ADJUSTING ASSET VALUE AND AVAILABILITY IN DATA RECORDS FOR MITIGATING SPECULATIVE TRADING IN A PREDICTION MARKET

(75) Inventor: António Miguel De Melo Esteves, Lisbon (PT)

(73) Assignee: Exago Ventures, S.A., Lisboa (PT)

( * ) Notice: Subject to any disclaimer, the term of this patent is extended or adjusted under 35 U.S.C. 154(b) by 0 days.

(21) Appl. No.: 13/525,366

(22) Filed: Jun. 18, 2012

(65) Prior Publication Data

US 2013/0339206 A1    Dec. 19, 2013

(51) Int. Cl.
*G06Q 40/00*    (2012.01)
(52) U.S. Cl.
USPC ............................. 705/36 R; 705/35; 705/37
(58) Field of Classification Search
USPC .......................................... 705/35, 36 R, 37
See application file for complete search history.

(56) References Cited

U.S. PATENT DOCUMENTS

| | | | |
|---|---|---|---|
| 5,687,968 A | 11/1997 | Tarantino | |
| 6,505,174 B1 | 1/2003 | Keiser et al. | |
| 7,590,584 B1 | 9/2009 | Stokes et al. | |
| 7,599,876 B1 | 10/2009 | Lo et al. | |
| 7,742,972 B2 | 6/2010 | Lange et al. | |
| 7,788,158 B2 | 8/2010 | Pennock | |
| 8,326,724 B1* | 12/2012 | Efron et al. | 705/36 R |
| 2003/0014342 A1* | 1/2003 | Vande Pol | 705/36 |
| 2005/0171891 A1* | 8/2005 | Daley et al. | 705/37 |
| 2009/0076939 A1 | 3/2009 | Berg et al. | |
| 2009/0076974 A1 | 3/2009 | Berg et al. | |
| 2009/0182624 A1 | 7/2009 | Koen et al. | |
| 2010/0125520 A1 | 5/2010 | Heyman et al. | |
| 2011/0137848 A1 | 6/2011 | Stephens, Jr. | |
| 2012/0296801 A1* | 11/2012 | Meacham et al. | 705/37 |
| 2012/0310815 A1* | 12/2012 | Reich et al. | 705/37 |

* cited by examiner

*Primary Examiner* — Lalita M Hamilton
(74) *Attorney, Agent, or Firm* — John P. White; Cooper & Dunham LLP (57) ABSTRACT

The present subject-matter belongs to the field of system and methods for automatic and electronic transaction control, namely in introducing minimum holding times and forcing transaction outcomes in a market. The system and method include adjusting asset value and availability for mitigating speculative market manipulation and pure speculative trading transactions outcomes in a prediction market. The modules introduce pure delays, selective delays or force the transaction outcome evaluations such that these goals are addressed. One of the principles used in these methods and modules is that by increasing the risk of the purely speculative or manipulative trading strategies, their expected payoff will be reduced. Thus participants will have less incentive to use them and their occurrence and impact will be greatly reduced.

20 Claims, 5 Drawing Sheets

SYSTEM AND METHOD FOR ADJUSTING ASSET VALUE AND AVAILABILITY IN DATA RECORDS FOR MITIGATING SPECULATIVE TRADING IN A PREDICTION MARKET

TECHNICAL FIELD

The present subject matter relates to a system and methods for automatic and electronic transaction control, namely in introducing minimum holding times and forcing transaction outcomes in a market.

BACKGROUND ART

The following patents or patent applications have been identified and found relevant in the field:

Dynamic pari-mutuel market—Pennock; U.S. Pat. No. 7,788,158;

Wagering system—Tarantino; U.S. Pat. No. 5,687,968;

Computer system for virtual share dealing—Stokes; U.S. Pat. No. 7,590,584;

Electronic market-maker—Lo; U.S. Pat. No. 7,599,876;

Enhanced parimutuel wagering—Lange; U.S. Pat. No. 7,742,972;

Computer-implemented securities trading system with a virtual specialist function; U.S. Pat. No. 6,505,174;

Application 20090182624: Method and Apparatus for Generating and Evaluating Ideas in an Organization;

Application Ser. No. 11/855,085: Continuous betting interface to prediction market;

Application Ser. No. 12/961,233: General prediction market;

Application Ser. No. 12/619,256: Method and apparatus for on-line prediction of product concept success;

Application Ser. No. 11/855,079: Combined estimate contest and prediction market;

DESCRIPTION OF RELATED ART

In the academic literature, there is no universal definition of the term "prediction market." Alternative terms used for the same concept include information markets, decision markets, idea futures, forecasting markets, artificial markets, electronic markets, and virtual stock markets. According to Berg et al. (Berg and Rietz, 2003, Berg et al., 2003), prediction markets are defined as markets that are run for "the primary purpose of aggregating information so that market prices forecast future events." Moreover, prediction markets can also serve as decision support systems by providing information about the current situation or by evaluating effects of decisions over time. (Berg and Rietz, 2003, Hanson, 1999). Source: Prediction Markets: Fundamentals, Key Design Elements, and Applications—Stefan Luckner Prediction market mechanisms can be used to evaluate the probability of occurrence of a specific event, to assess the perceived value of ideas (idea markets), to assess the perceived preference among a finite group of choices or, generally, to aggregate the information held by a group of participants about a specific event or asset.

Prediction market participants can be chosen from the general public or from a group that satisfies a specific set of access criteria.

In this context, an "Idea Market" is a prediction market specially suited to evaluate ideas for their intrinsic value contribution to a specified goal. Usually associated with Innovation Management processes, "Idea Markets" are used as an efficient way to select the most valuable ideas among a vast pool of proposals by market participants.

A "Corporate Prediction Market" is a prediction market whose participants are related to a corporation (employees, partners, suppliers, etc.) and the events or ideas subject to evaluation and information aggregation are relevant to the corporation.

A prediction market does not trade in financial assets—a prediction market is not a subset of a financial market, nor is a financial market a subset of a prediction market—though some concepts may be related, this does not rule out that a financial impact may be derivable from transactions in a prediction market.

Like in other types of markets, these are subject to participants finding the incentives not to reveal their "true" information about the event or asset subject to evaluation, engaging in speculative trading or market manipulation, which translates into defective price formation.

(partial Source: http://en.wikipedia.org/wiki/Keynesian_beauty_contest)

Speculative Market manipulation describes a deliberate attempt to interfere with the free and fair operation of the market and create artificial, false or misleading appearances with respect to the price of, or market for, a specific traded asset.

(partial source: http://en.wikipedia.org/wiki/Market_manipulation)

Pure Speculative Trading is, in this context, trading activity which relies on external, participant bias or market dynamic factors to achieve abnormal profits, rather than on the objective and good faith assessment of the asset's intrinsic value, although not aiming directly to manipulate market prices.

Defective price formation, from trading, in prediction markets can be especially acute in illiquid markets or when there is no specific external event with which trades can be evaluated. The last case is common in Corporate Idea Markets, where proposed ideas are evaluated and selected based on their market price without there ever being an independent idea valuation performed on the proposed ideas.

A "Keynesian Beauty Contest" is a market context where rational agents may be required to invest in a specific asset, but are rewarded if their assessment of value correctly predicts that of other participating agents. This would have people pricing assets not based on what they think their fundamental value is, but rather on what they think everyone else thinks their value is, or what everybody else would predict the average assessment of value is.

Some prediction markets are structured in ways that promote the occurrence of Keynesian Beauty Contests, where participants are rewarded by speculating on the likely investments of other participants and not on the intrinsic value of the asset being evaluated. In this context the existence of Speculative market manipulation or Pure speculative trading can exacerbate the degradation of the quality information aggregated by the prediction market.

Given that prediction market's relevance and the prediction market's reason to exist, depends on information revealed in prices, these deviations are particularly severe and significantly reduce its value.

Current proposed methods rely on structuring the markets in such a way that they are as efficient as possible and assuming that pernicious speculative price manipulation trading or market manipulation will be mitigated by bringing together many other participants providing their true assessments of events or assets.

Also, automated market maker mechanisms were proposed that guarantee infinite liquidity to the market and thus, in a way, increasing the number of possible trades results in the diminished impact of market manipulation and pure speculative trading.

However, it is still observed, in specific circumstances, that a relatively small group of participants, acting alone or in coordinated groups, are able to engage in manipulative trading, affecting the price formation for extended periods of time.

SUMMARY OF THE DISCLOSED SUBJECT MATTER

A system is disclosed with a set of modules and methods whose goal is to mitigate and reduce the occurrence of Speculative Market Manipulation and Pure Speculative Trading in a given prediction market Prediction Markets, whether it is used for event probability assessment, idea selection, concept evaluation or other uses.

One of the principles used in these methods includes that by increasing the risk of purely speculative price manipulation trading strategies, their expected payoff can be reduced. Thus participants will have less incentive to use them and their occurrence and impact will be greatly reduced.

BRIEF DESCRIPTION OF THE DRAWINGS

The figures are provided as illustrations which facilitate an understanding of the disclosed subject matter and are not to be seen as limiting the scope of the disclosed subject matter, but merely illustrating some of the various embodiments of the disclosed subject matter.

DETAILED DESCRIPTION OF EMBODIMENTS OF THE SUBJECT MATTER

The subject-matter hereby presented includes methods for selecting the target audience, methods that have the advantages of mitigating Speculative Market Manipulation and Pure Speculative Trading and methods for communication with participants.

Method and System for Selection of Target Participants (Method 1)

Figure 1:
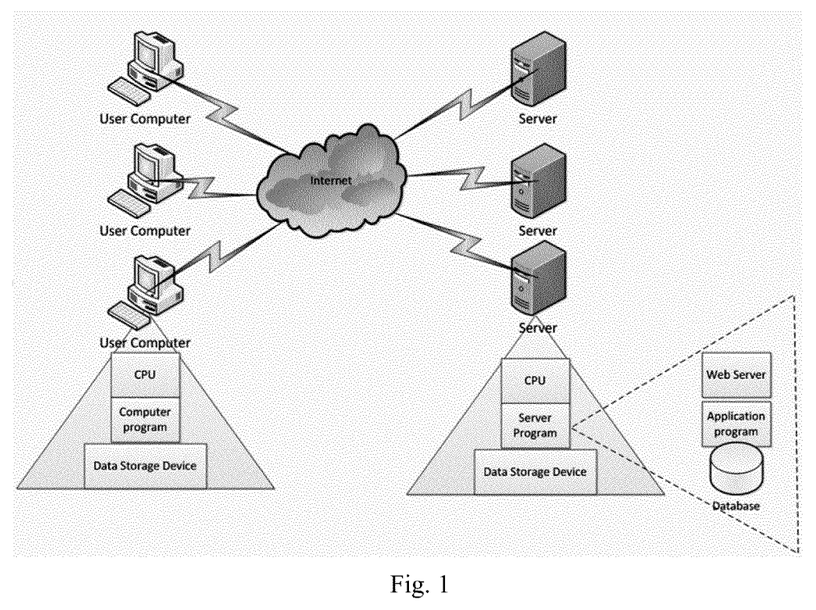
FIG. 1 illustrates the overall system architecture of an embodiment, describing both user and present system data processing units, namely the server program which in turn includes the web server stack, which in turn includes a database and program according to the disclosed subject matter.
Figure 2:
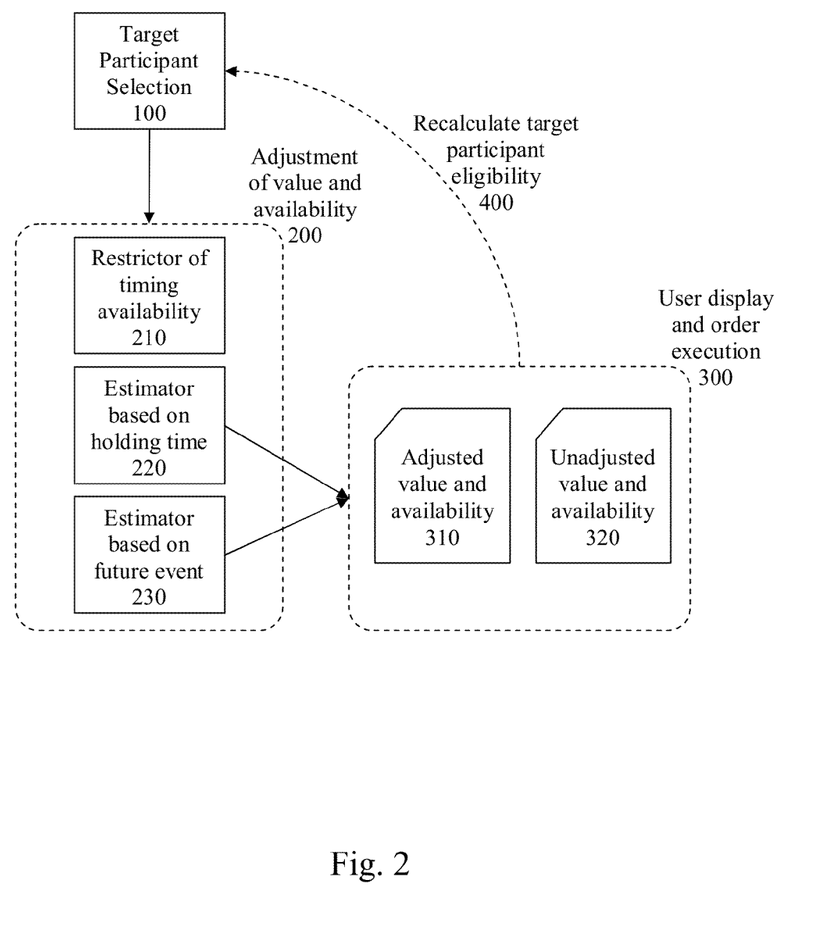
FIG. 2 illustrates the overall system architecture of another embodiment, whereby the following are represented:
(100) target participant selection module;
(200) value and availability adjustment module;
(210) restrictor sub-module of timing availability;
(220) estimator sub-module based on holding time;
(230) estimator sub-module based on future event;
(300) user display and order execution module;
(310) data records of adjusted value and availability;
(320) data records of unadjusted value and availability;
(400) target participant eligibility recalculation module.
Figure 3:
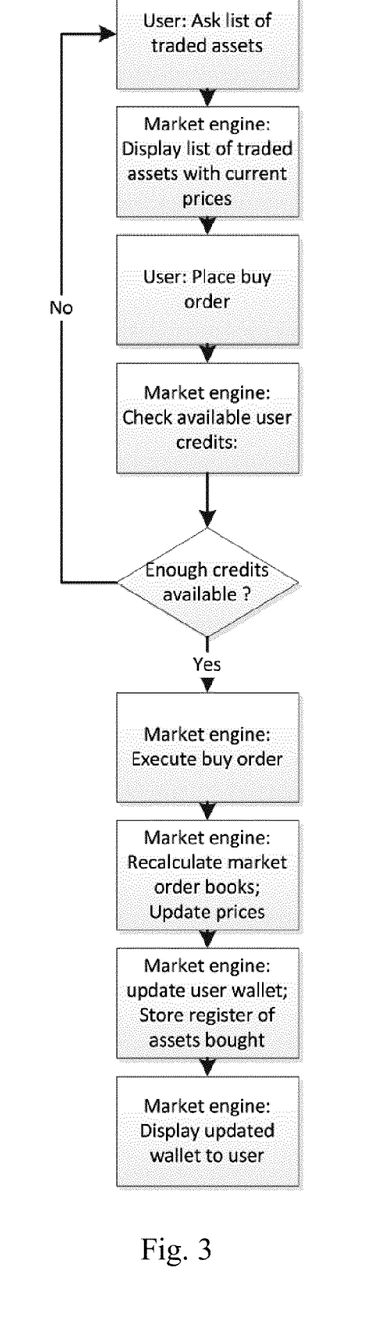
FIG. 3 illustrates a typical buying process, minor of the selling process herein described.
Figure 4:
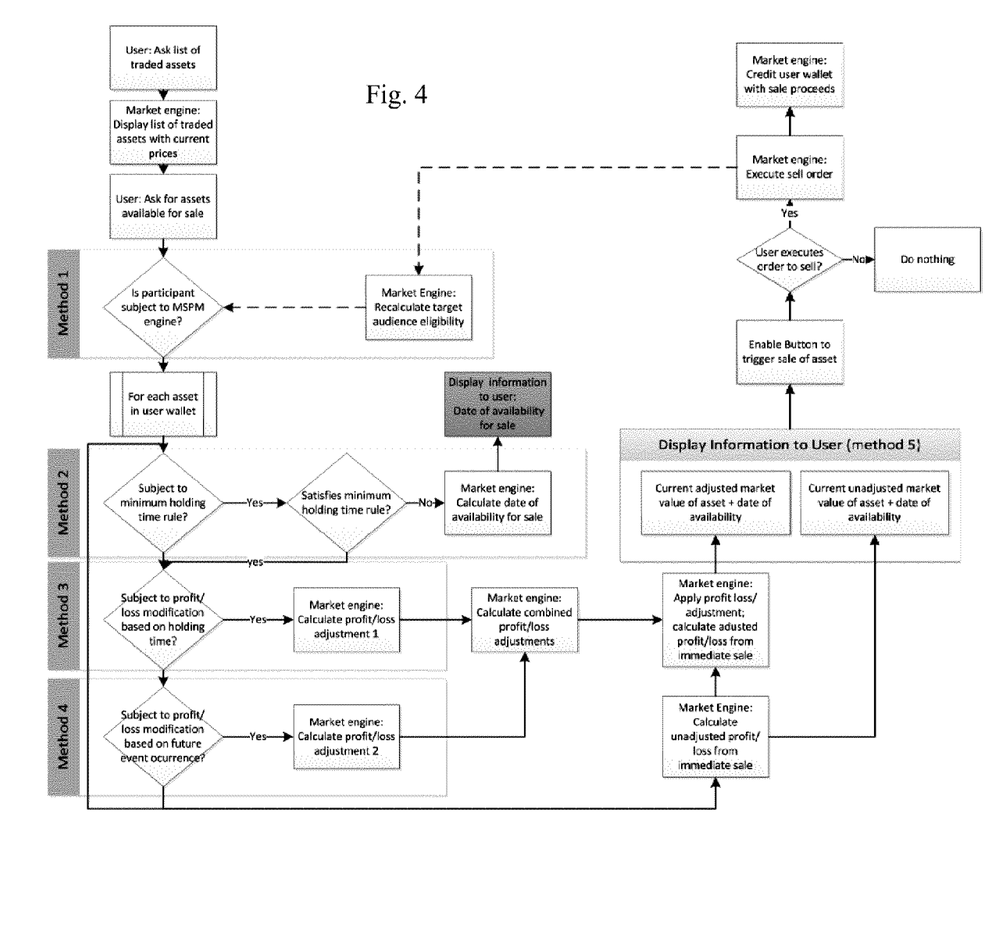
FIG. 4 illustrates a detailed system of another embodiment, wherein the target participant selection module 100 is detailed namely in "Method 1"; the value and availability adjustment module 200 is detailed namely in "Method 1-3"; the restrictor sub-module of timing availability 210 is detailed namely in "Method 2"; the estimator sub-module based on holding time 220 is detailed namely in "Method 3"; the estimator sub-module based on future event 230 is detailed namely in "Method 4"; the user display and order execution module 300 is detailed namely in "Method 5".

The proposed methods and system have advantages in the mitigation of Speculative Market Manipulation and Pure Speculative Trading and can be applied to different groups of target participants. This process is also shown in FIG. 4. The following alternatives are illustrated:

All participants
The methods can be applied equally to all participants
Selection based on intrinsic characteristics
The group of target participants can be selected based on criteria applied to their intrinsic characteristics (independent of their participation). Examples of intrinsic characteristics include age, gender, geographic location, occupation, etc.
Selection based on trading behavior
The group of target participants is selected based on criteria applied to their trading behavior in the market. Examples: frequency of trading, ratio of winning trades, historic accuracy of trades, average impact on market pricing, average rotating time of investment wallet, etc.

Figure 5:
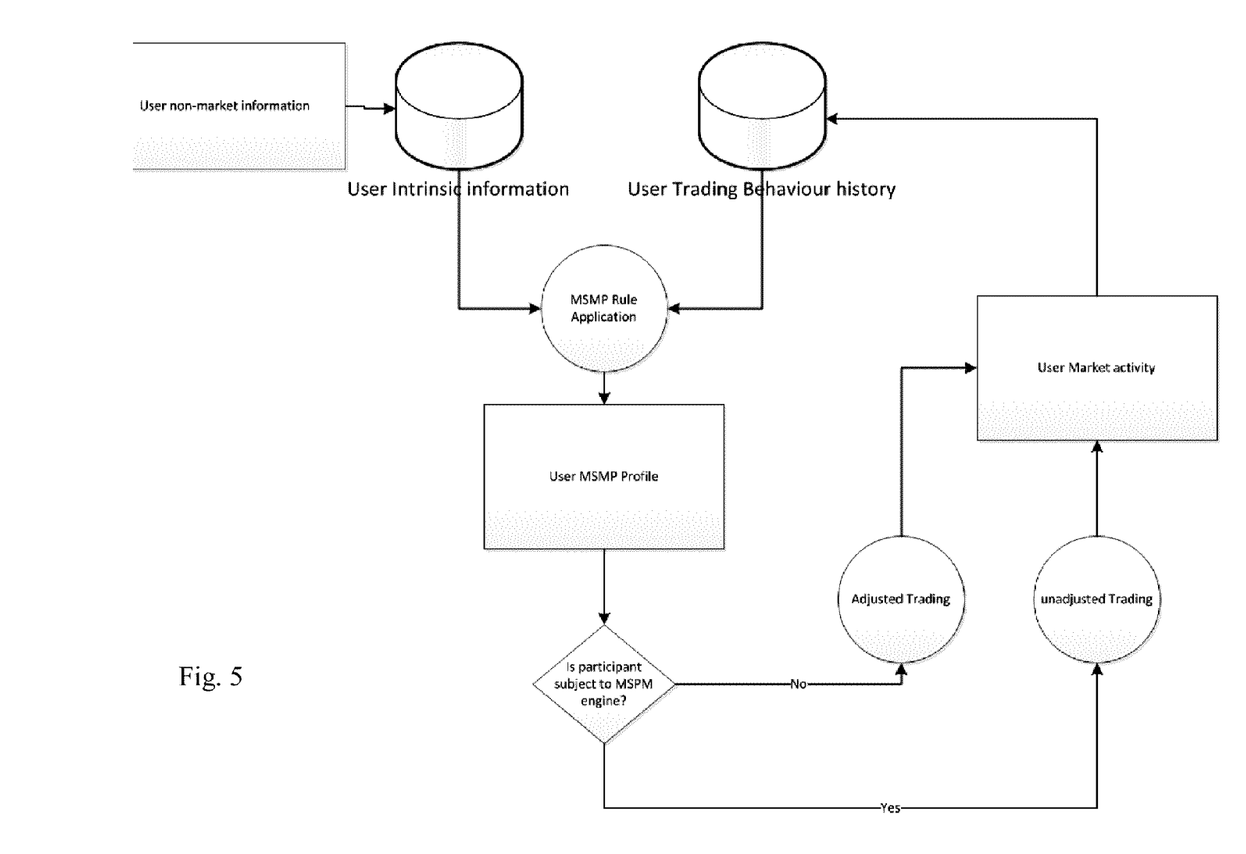
FIG. 5 illustrates a detailed target participant selection module 100 of another embodiment.

The above alternatives are also embodied in FIG. 5 pertaining to a detailed target participant selection module 100. MSMP is the abbreviation for "Market Speculative Manipulation Profile," that is the production of an indicator based on profile and activity, such that the methods to be applied to a specific user can be defined.

In one of its most basic embodiments, MSMP can be a simple attribute attached to each user, comprising sub-attributes corresponding to each mitigation method, specifying a score relative to the application suitability of each method. Most simply, each sub-attribute can be a true/false parameter.

Methods for Mitigation of Speculative Market Manipulation and Pure Speculative Trading These methods can be applied to the participants found to belong to the selected target groups and can have the advantage to increase their risk, thus reducing expected payoff, of the undesired trading strategies. The disclosed system may thus allow direct access of the market transactional system to a selection of participants, while forcing others to go through a sub-module implementing these methods. Alternatively, all participants may go through this sub-module.

Method 2—Increase Mandatory Holding Time of Securities

Generally in prediction markets trades are immediately completed whenever there can be a suitable trading partner (asking price equal or below bid price), whether it be another participant or an automated market maker.

This method is also illustrated in FIG. 4 and can enforce a minimum delay for the trade completion, namely by holding the transaction data records or flagging an appropriate data variable. The disclosed system introduces a delay sub-module responsible for holding the transaction data records or flagging an appropriate data variable. If the participant is buying a security, the buying operation will be completed but the security will be held, by this sub-module, by X hours before becoming available for sale by the security's new owner. If the participant is selling a security, the proceeds of the sale can be held by this sub-module, by Y hours before becoming available for use in another transaction. Obviously, both delays may be combined.

Restrictions in selling, buying and the values X and Y, can be set independently, or partially used.

Method 3—Modify Profit/Loss of Sales as a Function of Security Holding Time

Generally in prediction markets trades are immediately completed whenever there is a suitable trading partner (asking price equal or below bid price), whether it be another participant or an automated market maker.

This method is also shown in FIG. 4 and establishes a target holding time, A, for a security bought by a participant. The disclosed system introduces a specially configured compensation delay sub-module responsible for the target holding time.

If the effective holding time, B, exceeds A, the sale of the security can result in the regular profit/loss arising from the prevalent market price—the sub-module does not activate and the transaction data records follow their normal data path.

If the effective holding time, B, at the time of sale is less than target holding time, A:
  a. If the prevalent market price originates a profit from the sale, the profit can be reduced by a function of B/A—the sub-module can activate and force a recalculation of the transaction data records before following their normal data path. For example if a linear function is used and B is equal to A/2, the profit can be half of that directly resulting from the prevalent market price. The function can be linear or non-linear as deemed appropriate for the specific market.
  b. If the prevalent market price originates a loss from the sale, the loss can be increased by a function of A/B—the sub-module can activate and force a recalculation of the transaction data records before following their normal data path. For example if a linear function is used and A is equal to B*2, the loss can be twice of that directly resulting from the prevalent market price. The function can be linear or non-linear as deemed appropriate for the specific market.

Target holding time A, effective holding time B, the function for profit reduction and the function for loss increase, can be set independently, or partially used, with the compensation delay sub-module thus configured. Moreover, the estimator sub-module based on holding time recalculates an asset transaction data record upon an effective holding time of the asset being less than a predefined holding time such that the result of the transaction is deteriorated.

Method 4—Withhold Trading Profit/Loss until Event Occurrence

Generally Prediction markets applied to event probability assessment, idea evaluation, concept selection or others can be active for a specific traded security for a limited amount of time, until a specific external event occurs triggering a specific transaction holding sub-module. This external event can be used by this module to establish profit/loss of the securities held by the participants at the time the trading activity can be halted (before the event occurrence) or, if trading is not halted, as soon as the event outcome is known by the module.

Thus, profit and loss from investments may result from trading among participants before the event outcome is known (profit from buying lower, selling higher and loss from buying higher, selling lower) or by holding the securities when trading is halted or event occurs.

This method is also shown in FIG. 4 and can force all profit/loss realized before event occurrence to be a function of the event outcome by the operation of this sub-module.

1—For a security sale occurring when the market is still active and trades are executed among participants (or with an automated market maker), if resulting in profit, P, with the prevalent market price, the sub-module can activate and force a recalculation of the transaction data records before following their normal data path withholding a given percentage, X, from the profit. When the event occurs:
  a. If the security sold is found to be confirmed by the event, the profit, P*X, previously withheld, can be retained forever and lost by the participant.
  b. If the security sold is found to be unconfirmed by the event, the share of the profit previously withheld, P*X, can be transferred to the participant by said sub-module multiplied by a factor, Y, thus resulting in a credit of P*X*Y.

2—For a security sale occurring when the market is still active and trades are executed among participants (or with an automated market maker), if resulting in loss, with the prevalent market price, the sub-module activates and forces a recalculation of the transaction data records before following their normal data path withholding a given share, X, from the sales proceeds, S, thus the sales proceeds will be X*S, increasing the loss. When the event occurs:
  a. If the security sold is found to be confirmed by the event, no further action will be performed.
  b. If the security sold is found to be unconfirmed by the event, the retained sales proceeds, S, will be credited and transferred to the participant by said sub-module multiplied by a factor, Y, thus resulting in a credit of S*X*Y.

Methods for Communication with Participant

The methods presented above whereby manipulating a market transaction data structures, have the advantages of mitigation of Speculative Market Manipulation and Pure Speculative Trading, creating the necessary incentives for a reduction of undesired trading strategies. Being applied all or some of the presented system or methods, it is expected that participants incorporate the modified risk/reward assessments in their market behavior.

With the goal of reinforcing the effectiveness of the system and methods presented, it is proposed that the active mechanisms for pure speculative and manipulative trading mitigation are clearly presented to the participant in the interface used for trading, thus the following methods and sub-module.

Information Possibly Presented to Participants (Method 5)

1—When participant is included in target group due to trading behavior
  Present message stating clearly that the platform will apply pure speculative and manipulative trading mitigation mechanisms
  Present message stating clearly the criteria that resulted in the participant inclusion in target group 2—When participant is subjected to mitigation method 2
  For securities held, present message stating clearly that security will only be available for sale after date/time C
  For securities sold, present message stating clearly that proceeds of sale will only be available for trading after date/time D 3—When participant is subjected to mitigation method 3, for securities held for less that target holding time and available for sale:
  If prevalent market conditions would result in a profit, present message that states clearly that sale at current time will result in profit X and that waiting until date/time (target holding time), with market conditions unchanged, will result in profit Y (higher than X)
  If prevalent market conditions would result in a loss, present message that states clearly that sale at current time will result in loss X and that waiting until date/time (target holding time), with market conditions unchanged, will result in Loss Y (lower than X)

4—When participant is subjected to mitigation method 4, for securities available for sale to other participants:

If prevalent market conditions would result in a profit, present message that states clearly that:

If associated event unconfirms security held a profit of X will be credited, immediate sale will result in profit Y (lower than X)

If prevalent market conditions would result in a loss, present message that states clearly that:

If associated event confirms security held a loss of X will be credited, immediate sale will result in loss Y (higher than X)

The above modules and methods (namely methods 1-5) can of course be implemented via software, firmware, and/or hardware, such as a processor and/or processor means, which can include one or more microprocessors, integrated circuits, FPGA's, optical processor's, etc. Typically an application server coupled to a web server architecture may be used, possibly in a client-server configuration. The application may be distributed, or simply reside in one or more central servers. A database/application/server stack may be used. Typically, the application layer may be assured by a WAS server, using Java EE for processing XML data structures. The interfaces may use web service protocols such as SOAP. Middleware such as those based on messaging can be used, such as XMPP or simply based over JMS. A typical embodiment includes a Web logic 11g application server or a JBoss application server.

The provision of one or more of the mentioned lists can be advantageously provided by cursor or indexer data structures.

The provision of one or more of the mentioned selection steps can be advantageously provided by further cursor or indexer data structures.

The provision of one or more of the mentioned adjustment steps can be advantageously provided by procedural or transactional request messages. Optionally, these procedural or transactional request messages may incorporate the decision steps conditional to execution of said adjustment steps.

The provision of one or more of the mentioned enablement steps can be advantageously provided by indexed data structures or by signalizing messages.

The above described embodiments are straightforwardly combinable.

The disclosed subject matter is not in any way restricted to the embodiments described and a person with ordinary skill in the art will foresee many possibilities to modifications thereof without departing from the basic idea of the disclosed subject matter as defined in the appended claims.

The following claims further set out particular embodiments of the disclosed subject matter.

What is claimed is:

1. A system for a server application in a server device which includes a processor and a non-transitory medium that stores one or more programs of instruction executable by the processor, to adjust asset market value and time of availability, to mitigate speculative market manipulation and pure speculative trading transactions in a prediction market comprising:

a value and availability adjustment module that resides on the server device and that adjusts a market value and corresponding time of availability of asset data records, the value and availability adjustment module comprising:

a restrictor sub-module that restricts timing availability of the asset data records;

an estimator sub-module that estimates market value and time of availability of the asset data records based on a holding time; and an estimator sub-module that estimates market value and time of availability of the asset data records based on a future event;

a display and order execution module that resides on the server device; and a target participant selection module that resides on the server device and that determines based on the asset data records whether a participant attempting to execute a transaction on an asset is performing speculative market manipulation or pure speculative trading transaction, wherein in a case that the target participant selection module determines that the participant is performing speculative market manipulation or pure speculative trading transaction, said value and availability adjustment module calculates an adjusted market value and corresponding time of availability of the asset, based on the estimates obtained in at least one of the estimator sub-modules, and calculates an unadjusted market value and corresponding time of availability of the asset, and the display and order execution module presents the adjusted market value and corresponding time of availability of the asset and the unadjusted market value and corresponding time of availability of the asset, before permitting the transaction to proceed.

2. The system according to claim 1, wherein the target participant selection module is configured to:

on request, supply a list of traded assets;

on request, supply a list of available traded assets;

select a participant belonging to targeted participant selection; and subject the data record of the selected participant, to the value and availability adjustment module.

3. The system according to claim 1, wherein the restrictor sub-module of timing availability performs at least one of holding the transaction data record and flagging a data variable of transaction data record, such that a purchased asset is held for a first predetermined delay period and/or the proceedings of an asset sale are held for a second predetermined delay period.

4. The system according to claim 1, wherein the estimator sub-module based on holding time recalculates an asset transaction data record upon an effective holding time of the asset is less than a predefined holding time such that the result of the transaction is deteriorated.

5. The system according to claim 4, wherein the asset transaction data records is adjusted such that the result of the transaction is deteriorated by an amount, the amount being inversely related to the effective holding time when compared to the predefined holding time.

6. The system according to claim 5, wherein the asset transaction data records is adjusted such that only upon an occurrence of one of a profit or a loss, the result of the transaction is deteriorated by an amount inversely related to the effective holding time A when compared to the predefined holding time B.

7. The system according to claim 1, wherein the estimator sub-module based on future event is configured to, for a specific asset and for a specific future event, adjust the asset transaction data records in order to retain a predetermined percentage X, of a profit of the sale the asset in case of a profit, or a predetermined percentage of the sale of the asset in case of a loss, and if the asset sale is not confirmed by the future event, the estimator sub-module recalculates the asset transaction data records such that a result of the transaction is subsequently credited by a previously retained amount multiplied by a predetermined factor.

8. The system according to claim 1, wherein the display and order execution module are configured to:
- display the adjusted asset value and an adjusted asset availability date;
- display the unadjusted asset value and an unadjusted asset availability date; the display of the unadjusted value and the unadjusted date being either before, after, or simultaneously with the display of the adjusted asset value and the adjusted asset availability date; and
- only enable the transaction after the display of the adjusted asset value, the display of the adjusted asset availability date, the display of the unadjusted asset value, and the display of the unadjusted asset availability date.

9. The system according to claim 1, further comprising a target participant eligibility recalculation module, the target participant eligibility recalculation module for updating the target participant selection module based on the transaction data record results.

10. A method for a server application in a server device which includes a processor and a non-transitory medium that stores one or more programs of instructions executable by the processor, to adjust asset market value and time of availability, to mitigate Speculative Market Manipulation and Pure Speculative Trading in a prediction market, the method performed by the server device comprising:
- (a) determining based on asset data records whether a participant requesting to execute a transaction on an asset is performing speculative market manipulation or pure speculative trading transaction;
- (b) adjusting a market value and time of availability of the asset data records, including:
  - (b1) restricting a timing availability of the asset data records;
  - (b2) estimating the market value and the time of availability of the asset data records based on a holding time; and
  - (b3) estimating the market value and the time of availability of the asset data records based on a future event;
- (c) displaying to the participant an adjusted market value and corresponding time of availability of the asset and an unadjusted market value and corresponding time of availability of the asset;
- (d) receiving an order to execute the transaction from the participant; and
- in a case that it is determined in (a) that the participant is performing speculative market manipulation or pure speculative trading transaction,
  - calculating the adjusted market value and corresponding time of availability of the asset based on the estimates obtained in at least one of (b2) and (b3) and calculating the unadjusted market value and corresponding time of availability of the asset, and
  - causing (c) to be performed before permitting the transaction to proceed.

11. The method according to claim 10, wherein selecting the participant further comprises:
- on request, supplying the participant with a list of traded assets;
- on request, supplying the participant with a list of available traded assets;
- selecting participants belonging to a targeted participant selection; and
- subjecting the asset data record of the participant, to the value and the availability adjustment module.

12. The method according to claim 10, wherein restricting the timing availability further comprises holding the transaction data record or flagging a data variable of the transaction data record, such that a bought asset is held for a first predetermined delay period and/or the proceedings of the asset sale are held for a second predetermined delay period.

13. The method according to claim 10, wherein estimating the value and the availability of the asset data records based on the holding time further comprises recalculating the asset transaction data records upon an effective holding time of the asset is less than a predefined holding time, that the result of the transaction is deteriorated.

14. The method according to claim 13, wherein the asset transaction data records is adjusted such that a result of the transaction is deteriorated by an amount, the amount being inversely related to the effective holding time when compared to the predefined holding time.

15. The method according to the claim 14, wherein the asset transaction data records is adjusted such that only upon occurrence of a profit or a loss, the result of the transaction is deteriorated by an amount inversely related to the effective holding time A when compared to the predefined holding time B.

16. The method according to claim 10, wherein estimating the value and the availability of the asset data records of the asset based on the future event further comprises:
- adjusting the asset transaction data records in order to retain a predetermined percentage of a profit of the sale the asset in case of a profit, or a predetermined percentage of the sale of the asset in case of a loss; and
- upon the sale of the asset not being confirmed by the specific event, recalculating the asset transaction data records such that the result of the transaction is subsequently credited by a previously retained predetermined amount multiplied by a predetermined factor.

17. The method according to claim 10, wherein displaying the adjusted value and the adjusted availability asset data records, and receiving order execution, comprises:
- displaying the adjusted asset value and an adjusted asset availability date;
- displaying the unadjusted asset value and an unadjusted asset availability date; the displaying of the unadjusted asset value and the unadjusted asset availability date being before, after, or simultaneously with the displaying of the adjusted asset value and the adjusted asset availability date; and
- only enabling the transaction upon displaying the adjusted asset value, displaying the adjusted asset availability date, displaying the unadjusted asset value, and displaying the unadjusted asset availability date.

18. The method according to claim 10, further comprising a target participant eligibility recalculation module, the target participant eligibility recalculation module updating the target participant selection module based on the transaction data record results.

19. A computer program product, to adjust asset market value and time of availability, to mitigate Speculative Market Manipulation and Pure Speculative Trading in a prediction market, said computer program product being embodied in a non-transitory computer readable medium comprising a computer usable medium having computer usable program code embodied therewith, said computer usable program code comprising computer usable program code configured to carry out operations comprising:
- (a) determining based on asset data records whether a participant requesting to execute a transaction on an asset is performing speculative market manipulation or pure speculative trading transaction;

(b) adjusting a market value and time of availability of the asset data records, including:
- (b1) restricting a timing availability of the asset data records;
- (b2) estimating the market value and corresponding time of availability of the asset data records based on a holding time; and
- (b3) estimating the market value and corresponding time of availability of the asset data records based on a future event;

(c) displaying an adjusted market value and corresponding time of availability of the asset and an unadjusted market value and corresponding time of availability of the asset;

(d) receiving an order to execute a transaction from the participant; and in a case that it is determined in (a) that the participant is performing speculative market manipulation or pure speculative trading transaction, calculating the adjusted market value and corresponding time of availability of the asset based on the estimates obtained in at least one of (b2) and (b3) and calculating the unadjusted market value and corresponding time of availability of the asset, and causing (c) to be performed before permitting the transaction to proceed.

20. The computer program product according to claim 19, wherein the computer usable program code is further configured to:
- restricting of the timing availability by holding a transaction data record or flagging a data variable of the transaction data record, such that a bought asset is held for a first predetermined delay period and/or proceedings of the sold asset are held for a second predetermined delay period;
- estimating the value and the availability of asset data records of the asset based on the holding time if an effective holding time of the asset is less than a predefined holding time, the estimation being in the form of recalculating the asset transaction data records such that a result of the transaction is deteriorated;
- estimating the value and the availability of the asset data records based on future event comprising:
  - adjusting the asset transaction data records in order to retain a predetermined percentage X of the sale the asset, and, if the asset sale is not confirmed by the future event, recalculating the asset transaction data records such that the result of the transaction is subsequently credited by a previously retained predetermined percentage X of the sale the asset.

* * * * *